United States Patent
Raj et al.

(10) Patent No.: US 10,318,368 B2
(45) Date of Patent: Jun. 11, 2019

(54) ENABLING ERROR STATUS AND REPORTING IN A MACHINE CHECK ARCHITECTURE

(71) Applicant: Intel Corporation, Santa Clara, CA (US)

(72) Inventors: Ashok Raj, Portland, OR (US); Theodros Yigzaw, Sherwood, OR (US)

(73) Assignee: Intel Corporation, Santa Clara, CA (US)

( * ) Notice: Subject to any disclaimer, the term of this patent is extended or adjusted under 35 U.S.C. 154(b) by 14 days.

(21) Appl. No.: 15/168,999

(22) Filed: May 31, 2016

(65) Prior Publication Data
US 2017/0344414 A1 Nov. 30, 2017

(51) Int. Cl.
*G06F 11/00* (2006.01)
*G06F 11/07* (2006.01)

(52) U.S. Cl.
CPC ........ *G06F 11/079* (2013.01); *G06F 11/0721* (2013.01); *G06F 11/0751* (2013.01); *G06F 11/0772* (2013.01)

(58) Field of Classification Search
CPC .................................................. G06F 11/079
See application file for complete search history.

(56) References Cited

U.S. PATENT DOCUMENTS

| | | | | |
|---|---|---|---|---|
| 4,593,391 A * | 6/1986 | Mizushima | ......... | G06F 11/2205 714/34 |
| 4,964,130 A | 10/1990 | Bowden, III et al. | | |
| 6,647,517 B1 * | 11/2003 | Dickey | ............... | G06F 11/0772 714/25 |
| 6,948,094 B2 * | 9/2005 | Schultz | ............... | G06F 11/0772 714/15 |
| 7,315,961 B2 * | 1/2008 | Ramirez | ............. | G06F 11/0721 714/15 |
| 7,346,812 B1 * | 3/2008 | Wickeraad | .......... | G06F 11/0772 714/45 |
| 7,721,148 B2 * | 5/2010 | Brenden | ............. | G06F 11/0793 710/15 |
| 7,904,751 B2 * | 3/2011 | Marisetty | ............ | G06F 11/0793 714/10 |
| 8,028,189 B2 * | 9/2011 | Hsu | ...................... | G06F 11/0745 714/4.2 |
| 8,589,722 B2 * | 11/2013 | Sinykin | ............... | G06F 11/0745 714/2 |

(Continued)

OTHER PUBLICATIONS

PCT Notification of Transmittal of the International Search Report and the Written Opinion of the International Searching Authority for PCT Application No. PCT/US2017/030427, 12 pages, dated Sep. 12, 2017.

*Primary Examiner* — Christopher S McCarthy
(74) *Attorney, Agent, or Firm* — Lowenstein Sandler LLP

(57) ABSTRACT

In accordance with implementations disclosed herein, there is provided systems and methods for enabling error status and reporting in a machine check environment. A processing device includes an error status register and an error status component communicably coupled to the error status register. The error status component determines that a machine check error (MCE) is a first correctable error (CE) and sets a first error status corresponding to the first CE in the error status register based on a threshold value. The threshold value is based on a type of the first CE.

20 Claims, 15 Drawing Sheets

(56) References Cited

U.S. PATENT DOCUMENTS

| | | | |
|---|---|---|---|
| 8,793,438 B2 | 7/2014 | McAuley et al. | |
| 9,384,076 B2 * | 7/2016 | Auld | G06F 11/0793 |
| 9,495,233 B2 * | 11/2016 | McNairy | G06F 11/2215 |
| 2002/0073359 A1 * | 6/2002 | Wade | G06F 11/0721 |
| | | | 714/37 |
| 2003/0074601 A1 * | 4/2003 | Schultz | G06F 11/0772 |
| | | | 714/15 |
| 2004/0003313 A1 * | 1/2004 | Ramirez | G06F 11/0721 |
| | | | 714/6.24 |
| 2005/0229020 A1 | 10/2005 | Goodman et al. | |
| 2005/0246590 A1 | 11/2005 | Lancaster | |
| 2013/0339829 A1 * | 12/2013 | Vargas | G06F 11/1004 |
| | | | 714/807 |
| 2014/0019814 A1 * | 1/2014 | McNairy | G06F 11/2215 |
| | | | 714/49 |

* cited by examiner

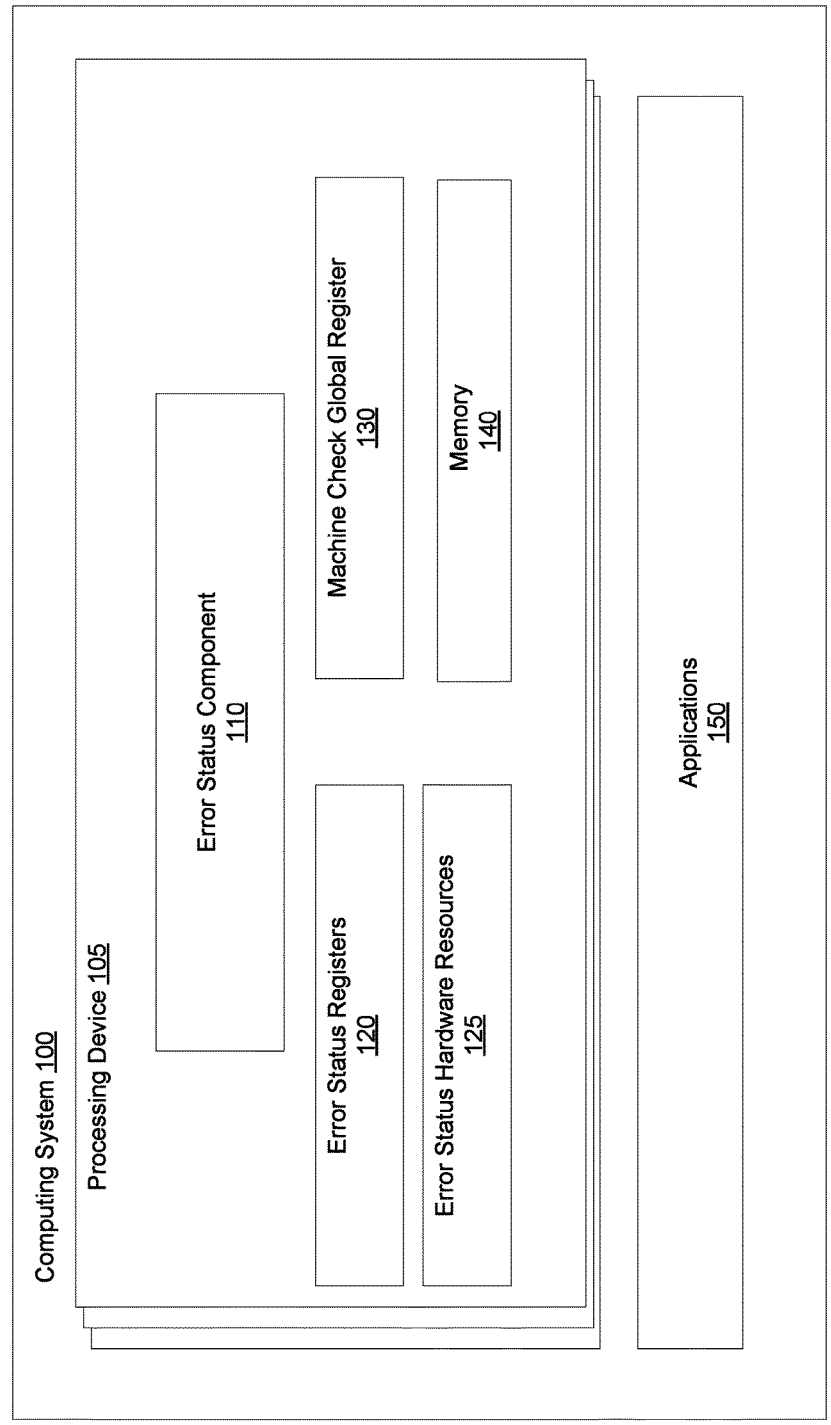

Overwrite Rules for Enabled Errors

| Logged Error | Future Error | UC Bit | MCA Info |
|---|---|---|---|
| 00/green | 00/green | 0 | Either Logged or Future Error |
| 00/green | 01/yellow | 0 | Future Error |
| 01/yellow | 00/green | 0 | Logged Error |
| 01/yellow | 01/yellow | 0 | Either Logged or Future Error |
| 00/green or 01/yellow | UC | 1 | Future Error |
| UC | 00/green or 01/yellow | 1 | Logged Error |

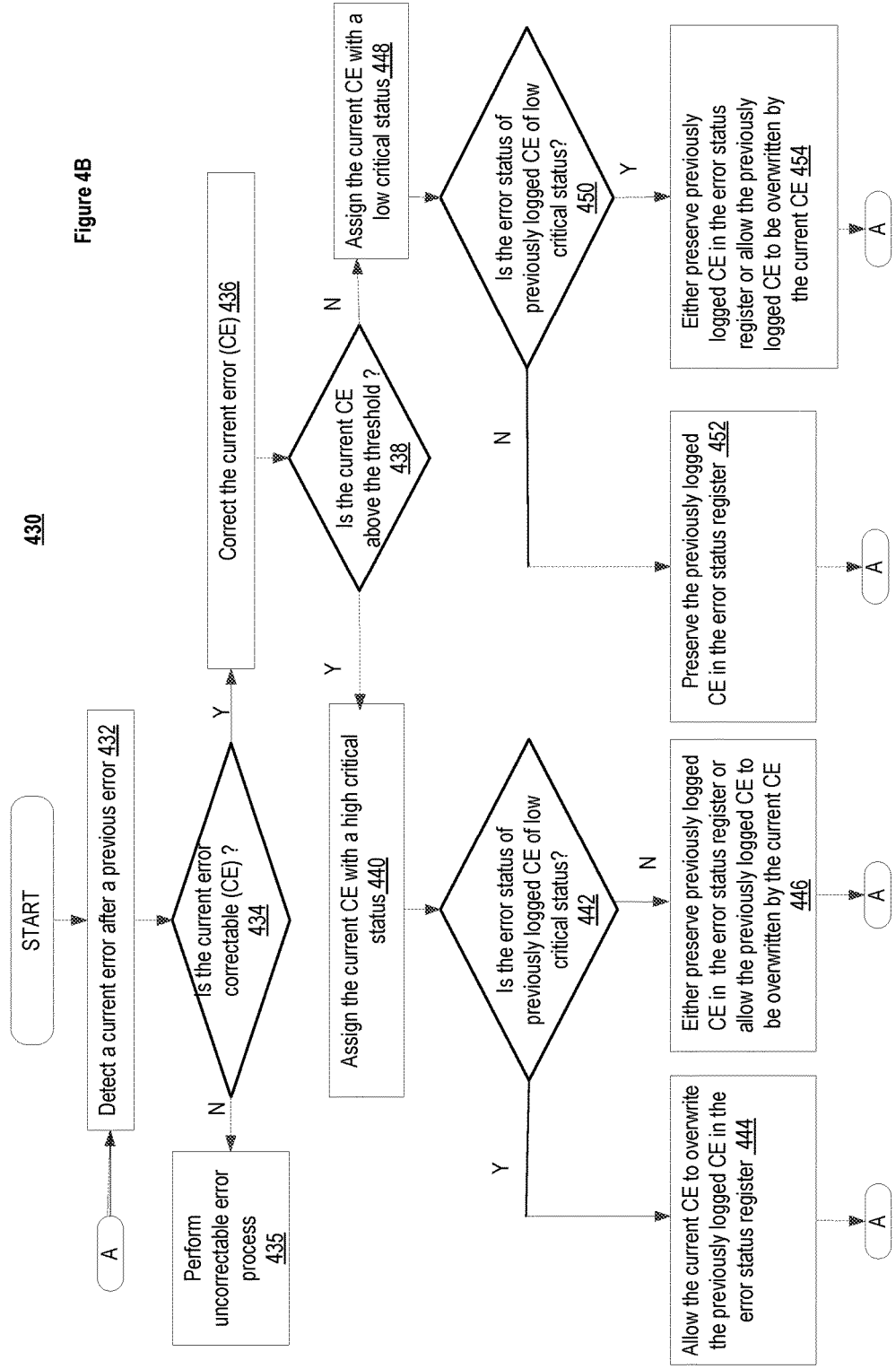

ENABLING ERROR STATUS AND REPORTING IN A MACHINE CHECK ARCHITECTURE

TECHNICAL FIELD

Implementations described herein relate to processing devices and, more specifically, relate to enabling error status and reporting in a machine check architecture for processing devices.

BACKGROUND

A computing system can include processing devices (e.g., microprocessors, etc.), which are increasing in complexity, core count, cache size, and number, for example. With this increase, the processing devices can become more susceptible to errors. An error can be detected by error detection logic in the computing system. Some errors may be recoverable errors, while other errors may not be recoverable. The errors that are not recoverable may result in failure of the computing system. A machine check architecture provides a standardized means to report error status to the system.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 1 is a block diagram of one implementation of a computing system including a processing device that implements a machine check architecture execution environment;

FIG. 3 is a block diagram illustrating an example of a table providing overwriting rules applied to errors according to an implementation of the disclosure;

FIG. 4B is a flow diagram illustrating a method for error status and reporting in a machine check architecture execution environment according to an implementation of the disclosure;

DETAILED DESCRIPTION

Figure 2A:
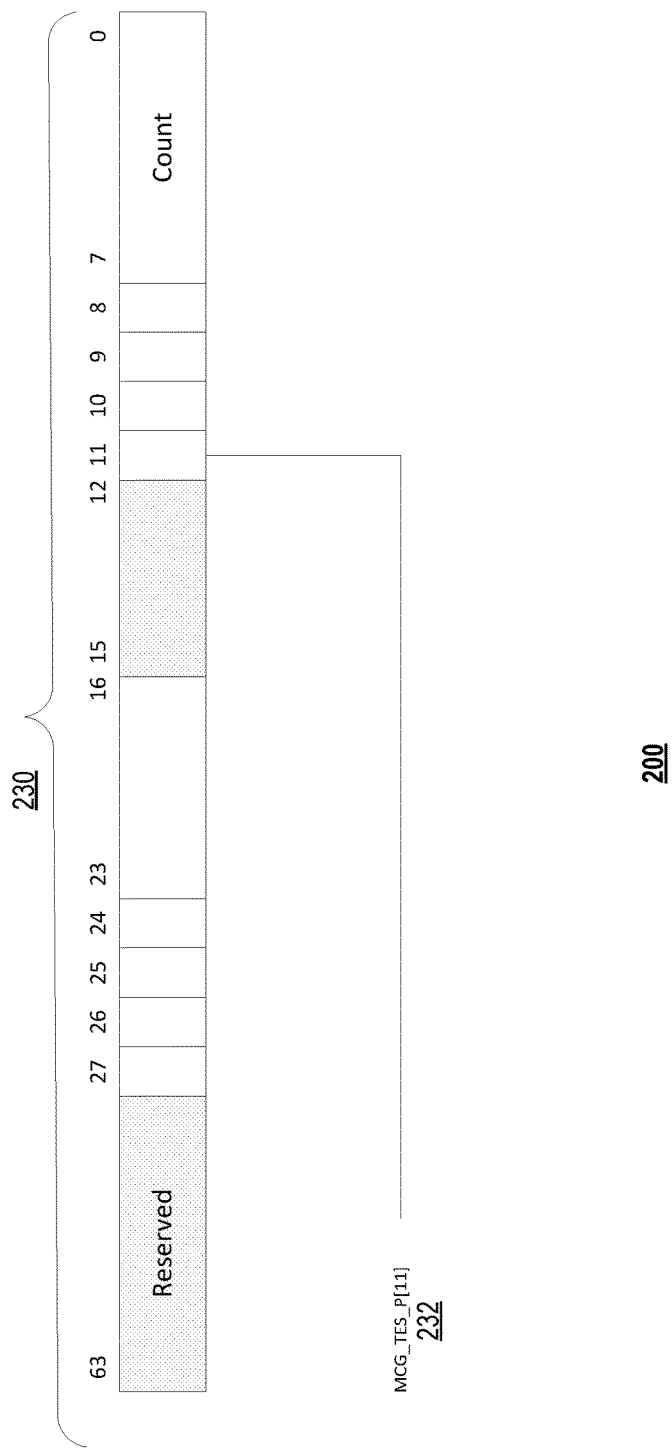
FIG. 2A is a block diagram illustrating an example of a layout of bit fields for a machine check architecture global register according to an implementation of the disclosure.

Disclosed herein are implementations for providing an error status environment for detecting and reporting status of machine check errors (referred to herein as "errors") that affect results of operations in a computing system (referred to herein as "system"). There are two types of errors, correctable error (CE) and uncorrectable error (UC). CEs are the errors that have been corrected by a processor, platform hardware, firmware or the operating system (OS). Errors generated by the hardware are logged in registers and signaled to the OS for logging and analysis. UCs are errors that are not correctable but may be recoverable under certain conditions. The UCs that are considered more severe or fatal cannot be recovered. Certain UCs that are not fatal may be corrected in hardware or software by having redundancy, consider memory mirroring for e.g. in such cases when the uncorrected error is corrected they are logged as CE's and signaled to the OS.

Current error detection and status solutions log CEs into the system. In addition, such solutions permit a previous error to be overwritten when a new error is more severe than an already-logged error. As a result, when the OS attempts to log a CE, another CE can potentially overwrite previously written CEs. However, an OS does not want to lose the previously written CE as it represents a critical error. Such a critical error may indicate, for example, which memory of a device is potentially degrading and may need to be replaced. Once the previously written CE is lost, the OS is not able to recover the CE in order to fix it and prevent it from occurring in the future.

Implementations of the disclosure alleviate the above-noted and other deficiencies by implementing an error status component in a machine check environment of the processing device. In one implementation, the error status component prevents a CE that represents a non-critical error from overwriting a logged CE that represents a critical error. In another implementation, the error status component allows the CE that represents a critical error to overwrite a logged CE that represents a non-critical error.

FIG. 1 is a block diagram of a computing system 100 that implements a machine check architecture (MCA) environment for processing devices. Some examples of computing system 100 may include, but are not limited to, computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine.

Computing system 100 may include, for example, one or more processing devices 105 to handle operations for computing system 100. Each processing device 105 may comprise one or more processing devices (also known as processors) situated in separate components, or alternatively, one or more processing cores embodied in a single integrated circuit (IC) arranged, for example, in a System-ona-Chip (SOC) configuration. In some implementations, the processing device is a general-purpose processing device. For example, each processing device 105 includes processing devices of the type commonly used as a central processing unit (CPU). In other implementations, the processing device may be a special-purpose processing device. Examples of special purpose processors include, but are not limited to, co-processing devices, graphics processing devices, communications processing devices, network processing devices, cryptographic processing devices, embedded processing devices, digital signal processing devices (DSPs), etc. Each processing devices 105 can be connected to a socket. In some implementations, if there are multiple processing devices 105, the processing devices 105 can be connected to the same socket or different sockets.

The computing system 100 may include one or more various applications 150 executed by the processing device 105. Instructions to implement applications 150 (i.e., computer-executable program) may be executed in the processing device 105. The instructions may include, but are not limited to, add operations, convert operations, permute operations, and shuffle operations.

Although each of processing device 105 and the application 150 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

Each processing device 105 may include a machine check global register (MCG) 130. The MCG 130 is a read-only register that provides information about the machine-check architecture of the processing device 105. Such information may include, but is not limited to, a number of hardware unit error reporting machine check architecture banks, signals based on detection of error, a threshold-based error status, and an error recovery.

Each processing device 105 may include an error status component 110, error status registers (registers) 120, and error status hardware resources 125.

Error status component 110 can execute instructions corresponding to the application 150. Instructions may include program code to cause the error status component to perform activities such as, but not limited to, determining that a machine check error (MCE) in processing device 105 is a correctable error (CE), logging the CE, setting an error status to the logged CE, preventing or allowing one of an overwrite of the logged error with a current CE (error occurring after the logged CE) based on the error status of the logged CE and error status of the current CE. Information, including instructions, data, etc. (not shown) may be stored in a memory 140.

Each processing device 105 may also include a memory 140. The memory 140 may include random access memory (RAM), non-volatile memory, or read-only memory (ROM) in a fixed or removable format. RAM may include memory to hold information during the operation of computing system 100 such as, for example, static RAM (SRAM) or dynamic RAM (DRAM). ROM may include memories such as computing device BIOS memory to provide instructions when computing system 100 activates, programmable memories such as electronic programmable ROMs (EPROMs), Flash, etc. In one implementation, the memory 140 is protected such that the memory 140 is accessible and/or modifiable by error status component 110.

Error status registers 120 can include registers and/or storage used during execution of instructions by error status component 110, while the computing system 100 is in an error status state, to assign an error status to the errors in. Error status registers 120 can include, but are not limited to, registers for temporary values, a stack pointer, a pointer to an error status information area, temporary storage for instructions to execute, a register to store the criticality of the error status in the computing system 100, etc. In one implementation, error status registers 120 can be protected in a manner where they are solely accessible and/or modifiable by error status component 110. The error status registers 120 may be readable to software executing outside of error status component 110.

Error status hardware resources 125 can include one or more state machines to be initiated by error status component 110. Each state machine in error status hardware resources 125 can test operation of hardware (not shown) in computing system 100 while computing system 100 is in an error status mode. For example, error status hardware resources 125 include a state machine that initiates hardware operations to test a cache. In another example, error status hardware resources 125 include a state machine that initiates hardware operations to test a memory.

During operation of the computing system 100, an instruction can be executed on the processing device 105 and the processing device 105 may detect an error during the execution of the instruction. In one implementation, the processing device 105 determines that the error is an uncorrectable error (UC). The processing device 105 may determine that the error is an UC when system software should reset to recover from the error. As an example, the UC error may occur due to processor operating out of specification, environmental factors, missing proper microcode updates, issues with the OS, faulty components such as add-in card, dual in-line memory module (DIMM), etc. When it is determined that the error is a UC, the processing device 105 determines whether the error is fatal. In one implementation, an error is determined to be fatal when a system is unable to resume execution of a software and requires a system reset. When it is determined that the UC is fatal, a MCE signal is generated. The MCE signal stops execution of the software and reports the fatal error. In one implementation, an error is considered not fatal when a system is able to interrupt the execution of the software and resume the execution without resetting the system. When it is determined that UC is not fatal, the processing device 105 corrects the error and generates a machine check error interrupt (CMCEI) signal. The CMCEI signal interrupts execution of the software and reports the error to the processing device 105.

In one implementation, the processing device 105 determines that the error is a correctable error (CE). The processing device 105 may determine that the error is a CE then the system software is interrupted to notify of the CE. In one implementation, operating system (OS) may log those CEs for later processing to identify if a component in the system is trending to fail, for example. Some examples of a CE error may include, but are not limited to, a single bit error, a double bit error, a memory error, a CPU error, a hardware failure error etc. A memory error may represent a device whose memory is potentially degrading. One example of when a memory error may occur is when memory is mirrored. An error may occur during memory when a data read from a master device of the memory is determined to be in error. Correct data is recovered successfully from a slave device of the memory, which has a copy of the data in the master device. As such, the error is corrected and identified as the CE, but the master device of the memory is considered to be potentially degrading device in the memory for having incorrect data.

Another example of when a memory error may occur is during usage of two-level memory. For instance, dynamic random access memory (DRAM) as a four level cache functions similarly to regular dual-in memory module (DIMM). In this example, when read data results in a DRAM cache are incorrect, the hardware drops the read data results and tries to fetch correct data from the far memory. When the correct data was recovered successfully from the far memory, the error was correct and identified as the CE, but the DRAM cache is considered to be potentially degrading cache in the memory.

A further example of when a memory error may occur is usage of DIMM memory when data from an address of a first DIMM device is incorrect and, consequently, the data is retrieved from an address of a second DIMM device, which is different from the first DIMM device. When the correct data is recovered from the second DIMM device, the error is corrected and identified as the CE, but the second DIMM device is considered to be potentially degrading device.

One example of a CPU error may include occurrence of an error in a link that communicates (e.g., interconnects) a CPU packet in a processor to IO hubs in a network. Such a link may include a series of multiple links connected serially to each other. An error may occur in data of one or more of the multiple links and the one or more links can be temporarily removed from the link to obtain corrected data in other of the multiple links. When the correct data is recovered from the other link, the error is corrected and identified as the CE, but the removed link(s) are considered as potentially degrading in the CPU.

In one implementation, processing device 105 corrects the CE and logs the CE in the error status register 120. In one implementation, the error status component 110 detects that the CE is logged in the error status register 120. In one implementation, the error status component 110 compares the logged CE with a threshold. The threshold may include a value (i.e., threshold value) assigned based on a type of the CE. In one implementation, the threshold value is pre-assigned prior to executing the operations in the computing system 100. In one implementation, the type of CE includes a single bit error that is below the threshold. In one implementation, the type of CE includes a double-digit error that falls below the threshold. In one implementation, the type of CE includes a memory error that falls above the threshold. The memory error may degrade a memory of the device. In one implementation, the type of error may include a hardware failure error that falls above the threshold.

In one implementation, the error status component 110 sets the error status of the CE based on this comparison. In one implementation, the error component sets the error status of the CE as a low critical status when the CE is below the threshold. In one implementation, the error component sets the error status of the CE as a high critical status when the CE is above the threshold. The error status component 110 may set the error status of the CE by assigning a value to a bit corresponding to the CE For example, when the error status of the CE is of low critical status, the value assigned to the bit corresponding to the CE is represented by a consecutive value of 00. In another example, when the error status of the CE is of high critical status, the value assigned to the bit of the CE is represented by a consecutive value of 10.

In one implementation, the error status component 110 may set the error status of the CE by assigning a visual indication to the bit corresponding to the CE. In one implementation, the visual indication is displayed on the error status register 120. In one implementation, the visual indication is a color. For example, when the error status of the CE is of low critical status, the color assigned to the bit of the CE is represented by a green color. In another example, when the error status of the CE is of high critical status, the color assigned to the bit of the CE is represented by a yellow color. In one implementation, the CMCI signal is generated after setting the error status of the CE.

In one implementation, an error may be referred to herein as occurring in the future. Such a future error (also referred to as a "future-occurring error") may refer to occurrence of an error after or subsequent to logging of the CE (also referred to as a "current CE"). The future error may be a CE. In one implementation, the error status component 110 prevents future-occurring CEs assigned with an error status of the low critical status from overwriting a previously logged CE in the error status register 120 when the error status of the previously logged CE is assigned with a high critical status. In one implementation, the error status component 110 allows an overwrite of the previously-logged CE in the error status register 120 with future-occurring CEs when the future-occurring CEs are assigned with an error status of a high critical status and the error status of the previously-logged CE is assigned with the high critical status. The future-occurring error may be a UC. In another implementation, a future-occurring UC is allowed to overwrite the logged CE in the error status register 120, regardless of the error status of the logged CE (i.e., assigned with the low or high critical status). The future occurring UC is an error that occurs after the logged CE.

FIG. 2A illustrates an example of a machine check architecture global (MCG) register 200 in accordance with one implementation of the disclosure. The MCG register 200 may be the same as MCG register 130 described with respect to FIG. 1. A layout 230 of the bit fields of the MCG register 200 may provide a comprehensive, standardized layout that provides information about the machine check architecture of the processor. In an implementation, the layout 230 may include individual bit positions corresponding to components of the processor. The layout 230 may include bits 0 through 63 providing different type of the information on the machine check architecture of the processor.

In one implementation, the layout 230 may include a machine check global threshold-based error status present (MCG_TES_P) bit 232. In one implementation, the MCG_TES_P bit 232 may be located at bit 11 of the MCG register 200. In one implementation, when value in MCG_TES_P bit 232 is 0 (i.e. clear) an error status report is not present in the error status register 120. In one implementation, when value in MCG_TES_P bit 232 is 1 (i.e. set) an error status report is present in the error status register 120, as described in greater detail herein below with respect to FIG. 2B.

Figure 2B:
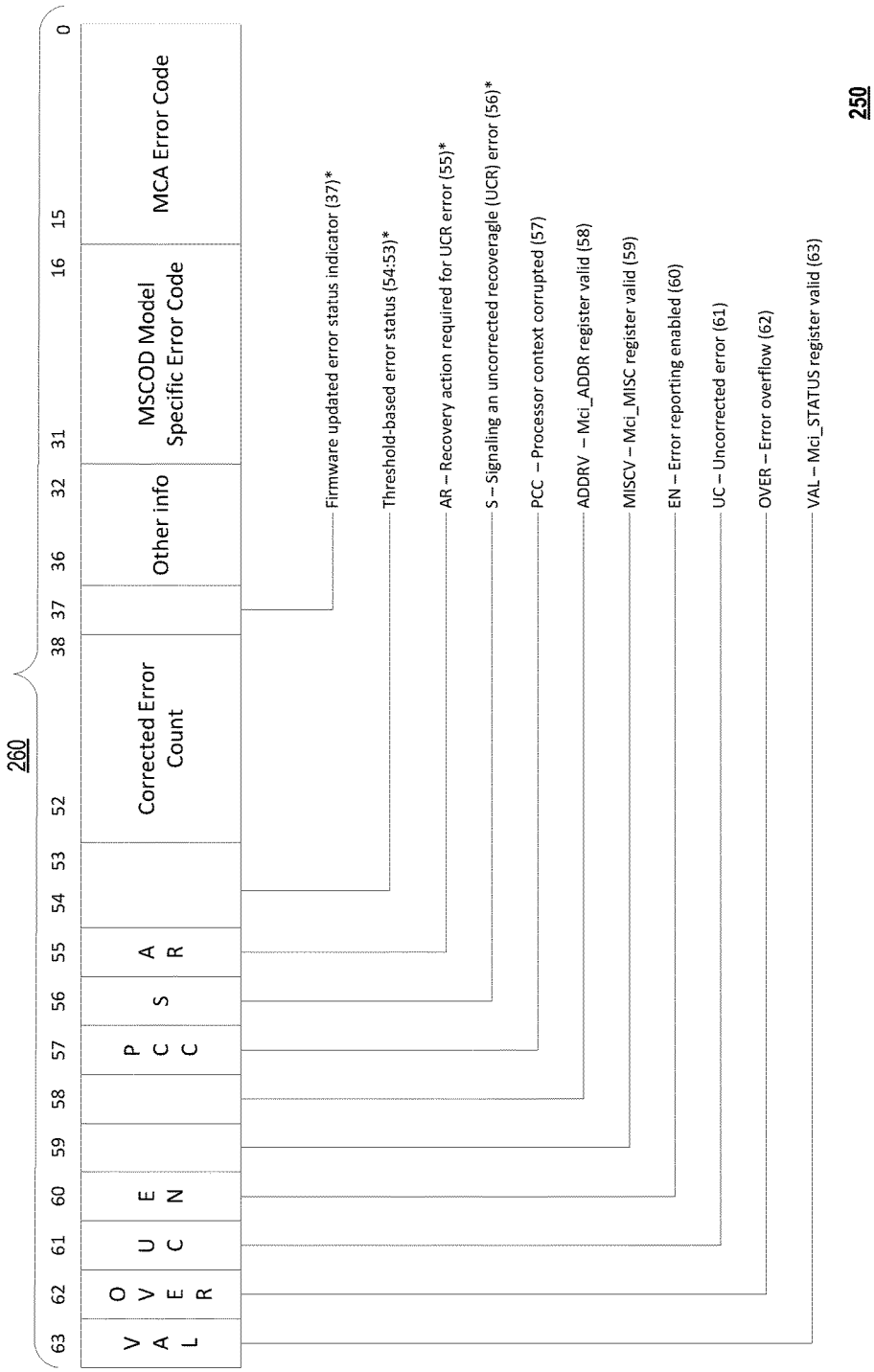
FIG. 2B is a block diagram illustrating an example of a layout of bit fields for an error status register according to an implementation of the disclosure.

FIG. 2B illustrates an example of an error status register 250 in accordance with one implementation of the disclosure. The error status register 250 may be the same as the error status register 120 described with respect to FIG. 1. A layout 260 of the bit fields of the error status register 250 may provide a comprehensive, standardized layout that provides information about the machine check architecture of the processor. In an implementation, the layout 260 may include individual bit positions corresponding to components of the processor. Although FIG. 2B illustrates bit positions corresponding to specific components of the processor, implementations of the disclosure encompass variations in positions of the bits corresponding to the specific components.

In one implementation, the layout 260 includes machine check architecture error code bits 0 to 15, which specify the MCA-defined error code for the detected MCE condition. The layout 260 may include model specific error code bits 16 to 31, which identify the model specific error code that identifies the detected MCE condition. The layout 260 may include other info bits 32 to 36, which function as floating bits used for general purposes. The layout 260 may include firmware updated error status indicator bit 37, which, when set, indicates an updated error status of the error, and, when clear, is part of the other info bits 32 to 36. The layout 260 may include corrected error count bits 38 to 52, which report a value of a 15 bit counter that increments each time a CE is detected.

The layout 260 may also include threshold-based error status bits 53 and 54, which, when clear, are part of the other info bits 32 to 36 and, when set, indicate an error status of the corrected error. The layout 260 may also include action required bit 55, which, when clear, is either reserved or is part of the other info bits 32 to 36 and, when set, indicate that the UC is to be corrected. The layout 260 may also include signal bit 56, which, when clear, either is reserved or is part of the other info bits 32 to 36 and, when set, signals reporting of an uncorrected recoverable error. The layout 260 may also include processor context corrupted bit 57, which, when set, indicates that the state of the processor might have been corrupted by the error condition detected and that reliable restarting of the processor may not be possible and, when clear, indicates that the error did not affect the processor's state and software may be able to restart. The layout 260 may also include address bit 58, which indicates the address where the error occurred. When the address bit 58 is clear, the address of the register is either not implemented or the register does not contain the address where the error occurred. When the address bit 58 is set, it indicates that the register does not contain the address where the error occurred. The layout 240 may also include a misc bit 59, which indicates additional information of the register. When the misc bit 59 is clear, it indicates that the register is either not implemented or does not contain any additional information regarding the error. When the misc bit 59 is set, it indicates that the register contains additional information about the error.

The layout 260 may further include error reporting enabled bit 60, which reports the error when set. When the error reporting enabled bit 60 is clear, it indicates that a specific machine check error (MCE) bank was not cause of the notification. The layout 260 may further include an UC bit 61, which, when set, indicates that the error is not correctable and, when clear, indicates that the error is correctable. The layout 260 may further include an overflow bit 62, which indicates that an error occurred while the results of a previous error were still in the register. When the overflow bit 62 is set, it indicates that a potential error was missed from being logged in the register, and thus the error may have been lost. When the overflow bit 62 is clear, it indicates the register is valid and no error has been lost. The layout 260 may further include a valid bit 63, which indicates that information within the register is still valid. When the valid bit 63 is set, the processor follows the rules given for the overflow bit 62 when overwriting a previously valid error entry. When the valid bit 63 is clear, it indicates that error log in the register is available for an error entry.

In one implementation, when the MCG_TES_P bit 232 of the layout 230 of the MCG register as discussed in FIG. 2A above is set and the UC bit in the layout 260 in the error status register 250 is clear, the threshold-based error status bits 53 and 54 are caused to be set. As discussed above, when bits 53 and 54 are set, they indicate the error status of the CE. The error status can be determined based on the threshold. In addition, as discussed above, in one example, the error status is indicated by flagging the bits with a green color or a value of 00 when the error status of the CE is a low critical status. When the error status of the CE is a high critical status, the bits are flagged with a yellow color or a value of 01. As such, bits 53 and 54 when set are flagged with either a green color (00) or a yellow color (01).

FIG. 3 illustrates an example of a table 300 illustrating overwrite rules applied to errors logged in an error status register, such as error status register 250 described with respect to FIG. 2B, according to an implementation of the disclosure. Table 300 depicts different scenarios in which the error status component 110 may one of allow or prevent an error from overwriting a logged CE in the error status register 120. As discussed above, the error status component 110 prevents a future CE assigned with an error status of low critical status from overwriting a logged CE in the error status register 120 when the logged CE is assigned with an error status of high critical status. Furthermore, the error status component 110 allows a CE assigned with an error status of high critical status to overwrite a logged CE in the error status register 120 when the logged CE is assigned with an error status of low critical status. In addition, as discussed above, the error status component 110 allows a UC to overwrite a logged CE in the error status register 120, regardless of the type of error status assigned to the logged CE. Such actions performed by the error status component 110 are provided as MCA information. Further, as discussed above, a value of 00 or a green color is assigned to a bit corresponding to the CE when the CE is indicated as having a low critical status, and a value of 01 or a yellow color is assigned to a bit corresponding to the CE when the CE is indicated as having a high critical status.

Table 300 of FIG. 3 provides multiple states 302-312 of logged errors, future errors, and UC bit, with corresponding actions provided under MCA info. In state 302, when a bit corresponding to the logged CE (in the error status register 120) is flagged with a 00/green, a bit corresponding to a future CE is also flagged with a 00/green, and the UC bit is flagged with a 0 (i.e. clear), the action taken by the error status component 110 may be to either preserve the logged CE or allow an overwrite of the logged CE with the future CE in the error status register 120. In one implementation, a criteria to determine whether to preserve the logged CE or allow an overwrite of the logged CE with the future CE is based on the severity of the CE. In one implementation, the severity of the CE is based on product specification. In state 304, when a bit of the logged CE is flagged with a 00/green, a bit corresponding to the future CE is flagged with a 01/yellow, and the UC bit is flagged with a 0 (i.e. clear), the action taken by the error status component 110 is to allow an overwrite of the logged CE with the future CE in the error status register 120. In state 306, when a bit corresponding to the logged CE (in the error status register 120) is flagged with a 01/yellow, a bit corresponding to a future CE is flagged with a 00/green and the UC bit is flagged with a 0 (i.e. clear), the action taken by the error status component 110 is to preserve the logged CE and prevent an overwrite of the logged CE with the future CE in the error status register 120. In state 308, when a bit corresponding to the logged CE (in the error status register 120) is flagged with a 01/yellow, a bit corresponding to a future CE is also flagged with a 01/yellow and the UC bit is flagged with a 0 (i.e. clear), the action taken by the error status component 110 may be to either preserve logged CE or allow an overwrite of the logged CE with the future CE in the error status register 120. As discussed above, a criteria to determine whether to preserve the logged CE or allow an overwrite of the logged CE with the future CE is based on the severity of the CE. In one implementation, the severity of the CE is based on product specification. In state 310, when a bit corresponding to the logged CE (in the error status register 120) is flagged with an either a 01/yellow or a 00/green, a future error is the UC as indicated by the UC bit as 1 (i.e. set), the action taken by the error status component 110 is to allow overwrite of the logged CE with the future UC in the error status register 120. In state 312, when a UC is logged, a bit corresponding to the logged UC (in the error status register 120) is indicated as 1 (i.e. set), and an a future error is a CE flagged with either a 01/yellow or a 00/green, the action taken by the error status component 110 is to prevent the overwrite of the logged UC in the error status register 120.

Figure 4A:
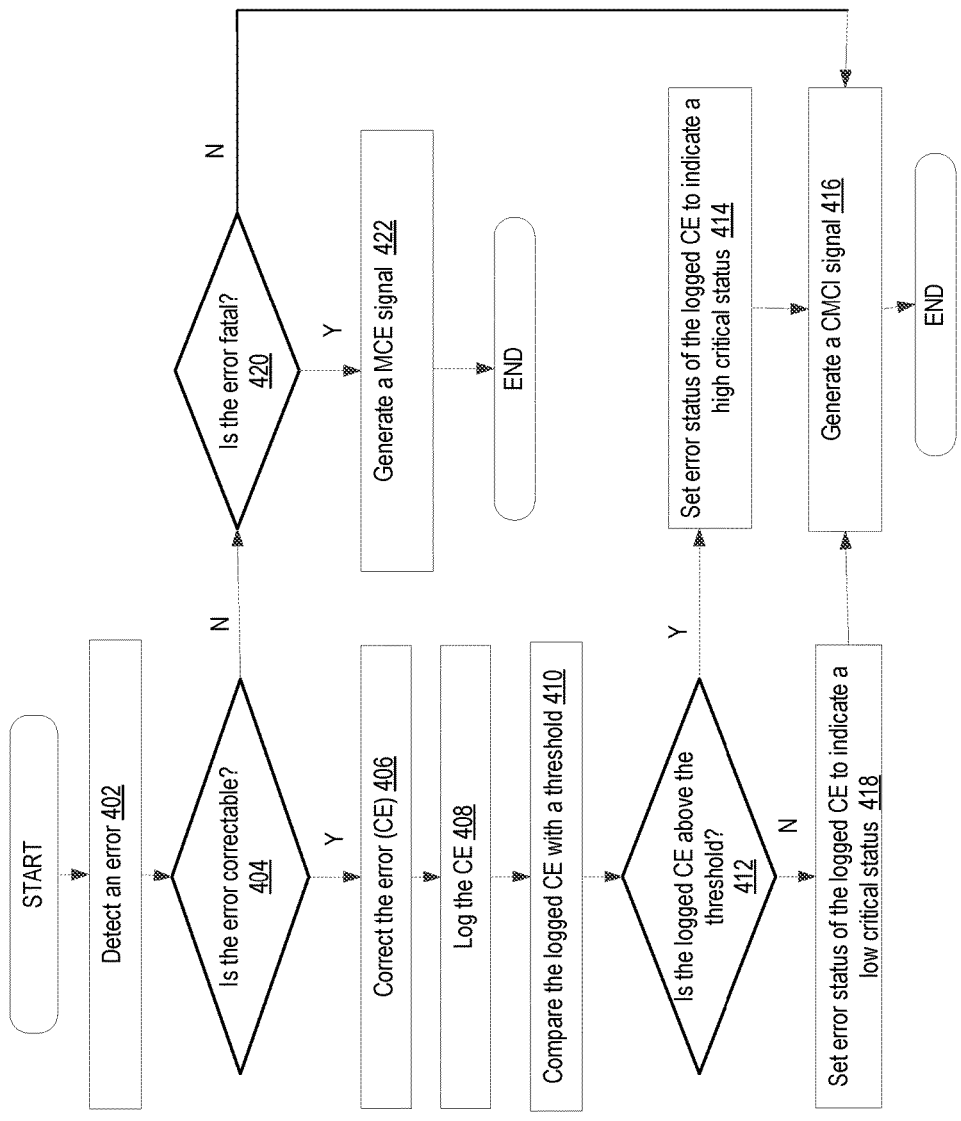
FIG. 4A is a flow diagram illustrating a method for error status and reporting in a machine check architecture execution environment according to an implementation of the disclosure.

FIG. 4A is a flow diagram of a method of enabling error status and reporting in a machine check architecture for a processing device, according to an implementation of the disclosure. Method 400 may be performed by processing logic that may include hardware (e.g., circuitry, dedicated logic, programmable logic, microcode, etc.), software (such as instructions run on a processing system, a general purpose computer system, or a dedicated machine), firmware, or a combination thereof. In one implementation, method 400 may be performed, in part, by the error status component 110 described with respect to FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4A, at block 402, an error is detected during execution of an instruction by the processing device. At block 404, it is determined whether the error is correctable (e.g., CE). An error is determined to be a CE when the system software is interrupted to notify the OS. When, at block 404, it is determined that the error is correctable, then the error is corrected at block 406. At block 408, the CE is logged in an error status register. In one implementation, the error status register is same as error status register 120 of FIG. 1 and/or error status register 250 of FIG. 2B. At block 410, the logged CE is compared with a threshold. As discussed above, the threshold may include a value assigned based on a type of the CE. In one implementation, the type of error includes a single bit error that is below the threshold. In one implementation, the type of error includes a double-digit error that falls below the threshold. In one implementation, the type of error includes a memory error that falls above the threshold. The memory error may degrade a memory of the device. In one implementation, the type of error includes a hardware failure error that falls above the threshold.

At block 412, it is determined whether logged CE is above the threshold. When, at block 412, it is determined that the logged CE is above the threshold, then, at block 414, an error status for the logged CE is set to indicate a high critical status. At block 416, a corrected machine check interrupt (CMCI) signal is generated and method 400 ends.

On the other hand, when, at block 412, it is determined that CE is not above the threshold (i.e., it falls below the threshold), then, at block 418, an error status for the logged CE is set to indicate a low critical status. Method 400 then proceeds to block 416, where a CMCI signal is generated and method 400 ends.

Referring back to block 404, when it is determined that the error is not correctable (i.e., UC), then, at block 420, it is determined whether the error is a fatal error. An error is determined to be fatal when the error cannot be recovered. When at block 420, it is determined that the error is not fatal, then the block 416 is repeated. When at block 420, it is determined that the error is fatal, then at block 422, a MCE signal is generated.

FIG. 4B is a flow diagram of another method of enabling error status and reporting in a machine check architecture for a processing device, according to an implementation of the disclosure. Method 430 may be performed by processing logic that may include hardware (e.g., circuitry, dedicated logic, programmable logic, microcode, etc.), software (such as instructions run on a processing system, a general purpose computer system, or a dedicated machine), firmware, or a combination thereof. In one implementation, method 430 may be performed, in part, by the error status component 110 described with respect to FIG. 1.

For simplicity of explanation, the method 430 is depicted and described as a series of acts. However, acts in accordance with this disclosure can occur in various orders and/or concurrently and with other acts not presented and described herein. Furthermore, not all illustrated acts may be performed to implement the method 430 in accordance with the disclosed subject matter. In addition, those skilled in the art will understand and appreciate that the method 430 could alternatively be represented as a series of interrelated states via a state diagram or events.

Referring to FIG. 4B, at block 432, a current error occurring after a previous error is detected. In one implementation, the previous error may be the error detected in block 402 as described with respect to FIG. 4A. At block 434, it is determined whether the current error is correctable. When, at block 434, it is determined that the current error is not correctable (i.e., UC), then, an uncorrectable error process is performed at block 435 In one implementation, the uncorrectable error process may be the same as the process beginning at block 420 of FIG. 4A. When, at block 434, it is determined that the current error is a CE, then, at block 436, the current error is corrected. At block 438, it is determined whether the current CE is above a threshold value. If, at block 438, it is determined that the current CE is above the threshold value, then method 430 proceeds to block 440 where an error status of the current CE is assigned with a high critical status. The high critical status may be the same as the high critical status as discussed above with respect to FIG. 4A. At block 442, it is determined whether the error status of the previously logged CE in the error status register is of low critical status.

At block 444, the current CE is allowed to overwrite the previously logged CE in the error status register when at block 442, it is determined the error status of the previously logged CE is of low critical status. Block 432 is repeated for the next current error. The low critical status is same as the low critical status as discussed above with respect to FIG. 4A. At block 446, either the previously logged CE is preserved in the error status register or the previously logged CE in the error status register is allowed to be overwritten by the current CE when at block 442, it is determined that the error status of the previously logged CE is not of low critical status (i.e. of high critical status). As discussed above, a criteria to determine whether to preserve the logged CE or allow an overwrite of the logged CE with the future CE is based on the severity of the CE. In one implementation, the severity of the CE is based on product specification. Block 432 is repeated for the next current error.

Returning back to block 438, when it is determined that the current CE is not above the threshold value (i.e. below the threshold value), then, at block 448, the current CE is assigned with a low critical status. The low critical status is same as the low critical status a discussed above with respect to FIG. 4A. Then at block 450, it is determined whether error status of the previously logged CE is of low critical status. At block 452, the previously logged CE is preserved in the error status register when at block 450 it is determined that the error status of the previously logged CE is not of low critical status (i.e. of high critical status). As such, the current CE is prevented from overwriting the previously logged CE. Block 432 is repeated for the next current error. At block 454, either the previously logged CE is preserved in the error status register or the previously logged CE in the error status register is allowed to be overwritten by the current CE when at block 450 it is determined that the error status of the previously logged CE is of low critical status. As discussed above, a criteria to determine whether to preserve the logged CE or allow an overwrite of the logged CE with the future CE is based on the severity of the CE. In one implementation, the severity of the CE is based on product specification. Block 432 is repeated for the next current error.

Figure 5A:
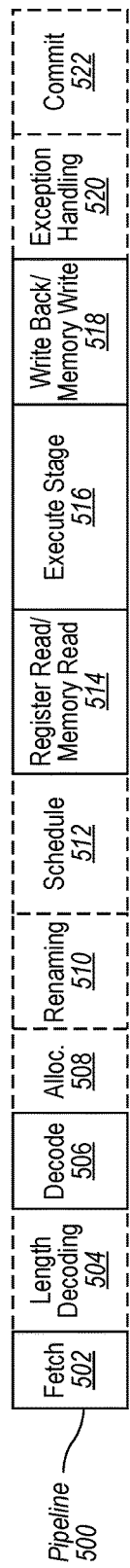
FIG. 5A is a block diagram illustrating a micro-architecture for a processor in which one implementation of the disclosure may be used.

FIG. 5A is a block diagram illustrating an in-order pipeline and a register renaming stage, out-of-order issue/execution pipeline implemented by processing device 500 according to some implementations of the disclosure. The solid lined boxes in FIG. 5A illustrate an in-order pipeline, while the dashed lined boxes illustrates a register renaming, out-of-order issue/execution pipeline. In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some implementations, the ordering of stages 502-524 may be different than illustrated and are not limited to the specific ordering shown in FIG. 5A.

Figure 5B:
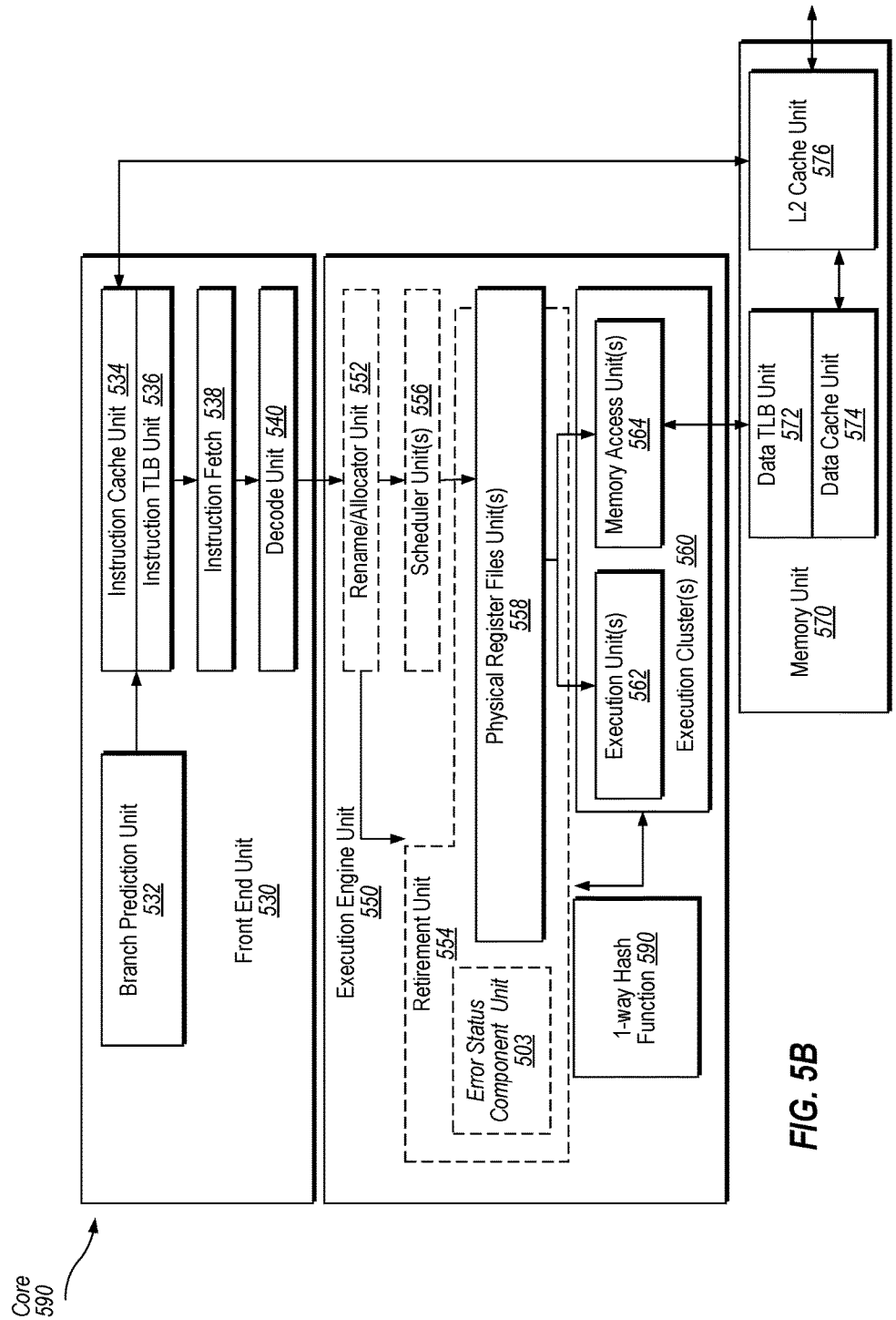
FIG. 5B is a block diagram illustrating an in-order pipeline and a register renaming stage, out-of-order issue/execution pipeline implemented according to at least one implementation of the disclosure.

FIG. 5B is a block diagram illustrating a micro-architecture for a processor 500 that implements the processing device including heterogeneous cores in accordance with one implementation of the disclosure. Specifically, processor 500 depicts an in-order architecture core and a register renaming logic, out-of-order issue/execution logic to be included in a processor according to at least one implementation of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one implementation, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The retirement unit 554 may include an error status component unit 503 to enable error status and reporting in a machine check environment for processing devices according to implementations of the invention. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processing device 105 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 556, physical register file(s) unit(s) 558, and execution cluster(s) 560 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain implementations are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some implementations DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary implementation, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one implementation, the data prefetcher 580 speculatively loads/prefetches data to the DCU 574 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

Figure 6:
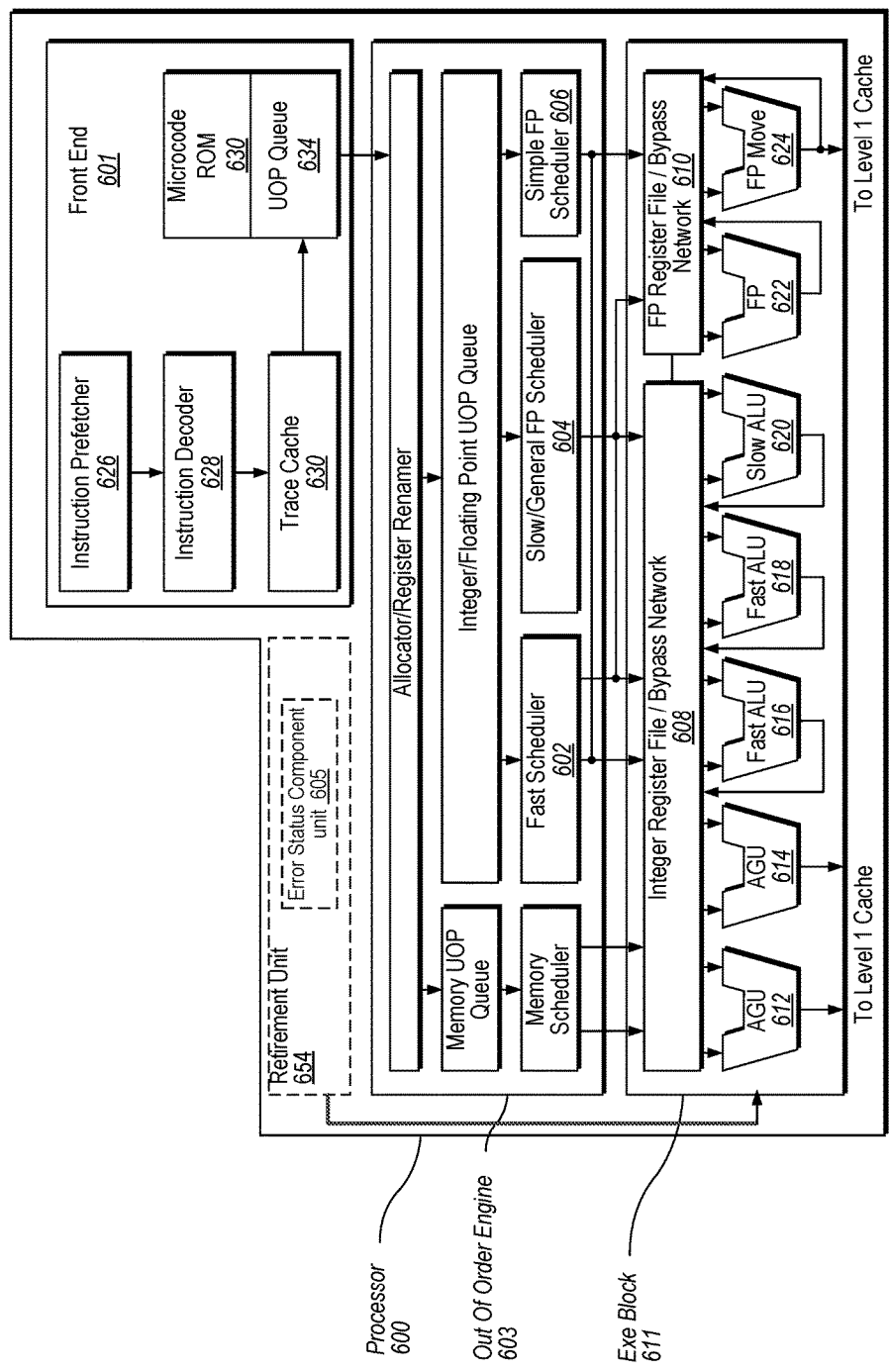
FIG. 6 illustrates a block diagram of the micro-architecture for a processor in accordance with one implementation of the disclosure.

FIG. 6 illustrates a block diagram of the micro-architecture for a processor 600 that includes hybrid cores in accordance with one implementation of the disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 601 is the part of the processor 600 that fetches instructions to be executed and prepares them to be used later in the processor pipeline.

The front end 601 may include several units. In one implementation, the instruction prefetcher 626 fetches instructions from memory and feeds them to an instruction decoder 628 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one implementation, if more than four micro-ops are needed to complete an instruction, the decoder 628 accesses the microcode ROM 632 to do the instruction. For one implementation, an instruction can be decoded into a small number of micro ops for processing at the instruction decoder 628. In another implementation, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one implementation from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one implementation can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one implementation also includes a bypass network that can bypass or forward just completed results that have not yet been written into the register file to new dependent uops. The integer register file 608 and the floating point register file 610 are also capable of communicating data with the other. For one implementation, the integer register file 608 is split into two separate register files, one register file for the low order 32 bits of data and a second register file for the high order 32 bits of data. The floating point register file 610 of one implementation has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one implementation is comprised of a number of execution units: address generation unit (AGU) 612, AGU 614, fast ALU 616, fast ALU 618, slow ALU 620, floating point ALU 622, floating point move unit 624. For one implementation, the floating point execution blocks 622, 624, execute floating point, MMX, SIMD, and SSE, or other operations. The floating point ALU 622 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 616, 618. The fast ALUs 616, 618, of one implementation can execute fast operations with an effective latency of half a clock cycle. For one implementation, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one implementation, the integer ALUs 616, 618, 620, are described in the context of performing integer operations on 64 bit data operands. In alternative implementations, the ALUs 616, 618, 620, can be implemented to support a variety of data bits including 16, 32, 128, 256, etc. Similarly, the floating point units 622, 624, can be implemented to support a range of operands having bits of various widths. For one implementation, the floating point units 622, 624, can operate on 128 bits wide packed data operands in conjunction with SIMD and multimedia instructions.

In one implementation, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The processor 600 also includes logic to implement store address prediction for memory disambiguation according to implementations of the disclosure. In one implementation, the execution block 611 of processor 600 may include a store address predictor (not shown) for implementing store address prediction for memory disambiguation.

The processor 600 may include a retirement unit 654 coupled to the execution block 611. The retirement unit 654 may include may include an error status component unit 605 to enable error status and reporting in a machine check environment for processing devices according to implementations of the disclosure.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store thirty-two bit integer data. A register file of one implementation also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register file or different register files. Furthermore, in one implementation, floating point and integer data may be stored in different registers or the same registers.

Figure 7:
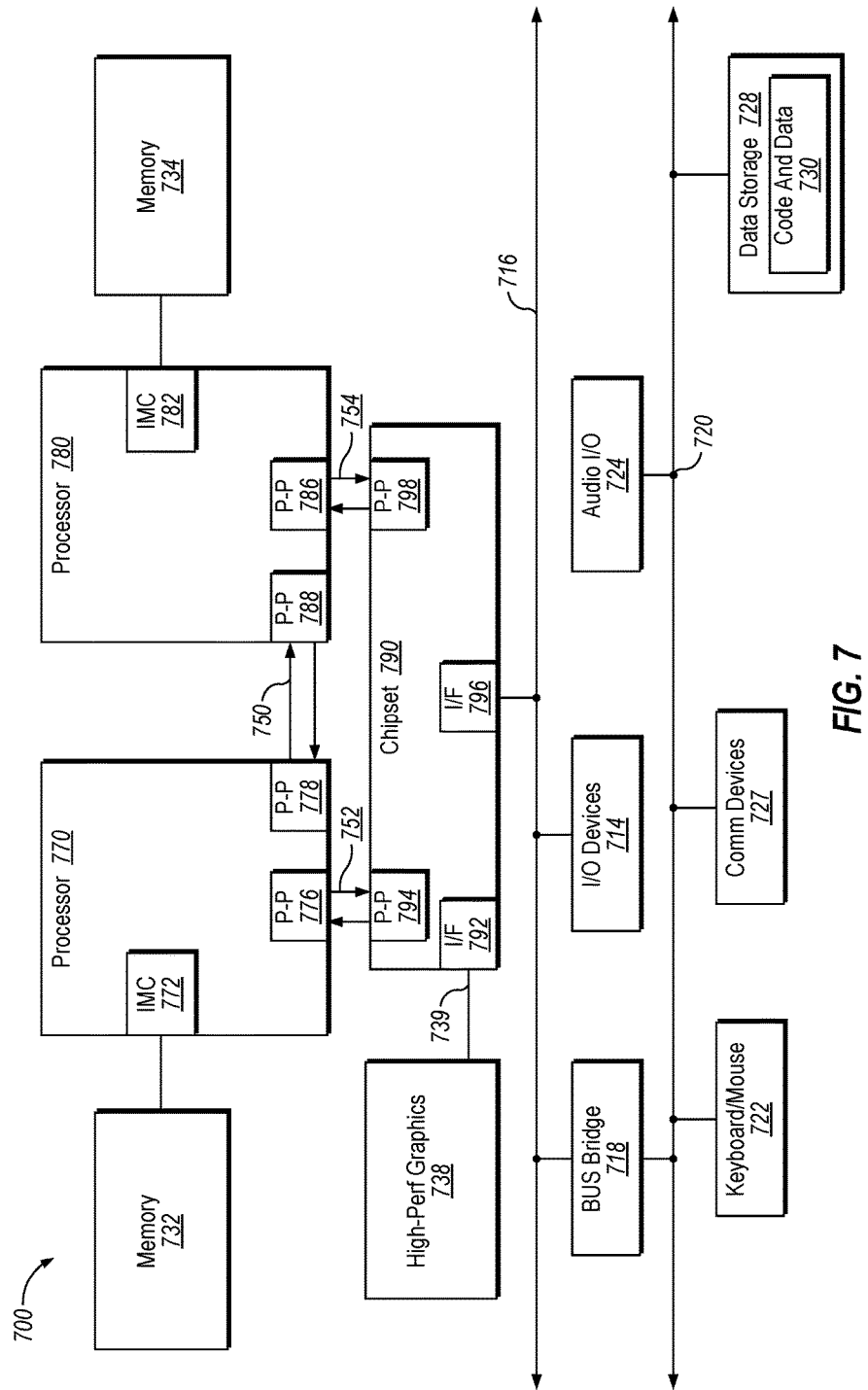
FIG. 7 is a block diagram illustrating a system in which an implementation of the disclosure may be used.

Referring now to FIG. 7, shown is a block diagram illustrating a system 700 in which an implementation of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of implementations of the disclosure is not so limited. In other implementations, one or more additional processors may be present in a given processor. In one implementation, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one implementation, first bus 716 may be a Peripheral Component Interconnect (PCI) bus, or a bus such as a PCI Express bus or another third generation I/O interconnect bus, although the scope of the disclosure is not so limited.

As shown in FIG. 7, various I/O devices 714 may be coupled to first bus 716, along with a bus bridge 718 which couples first bus 716 to a second bus 720. In one implementation, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one implementation. Further, an audio I/O 724 may be coupled to second bus 720. Note that other architectures are possible. For example, instead of the point-to-point architecture of FIG. 7, a system may implement a multi-drop bus or other such architecture.

Figure 8:
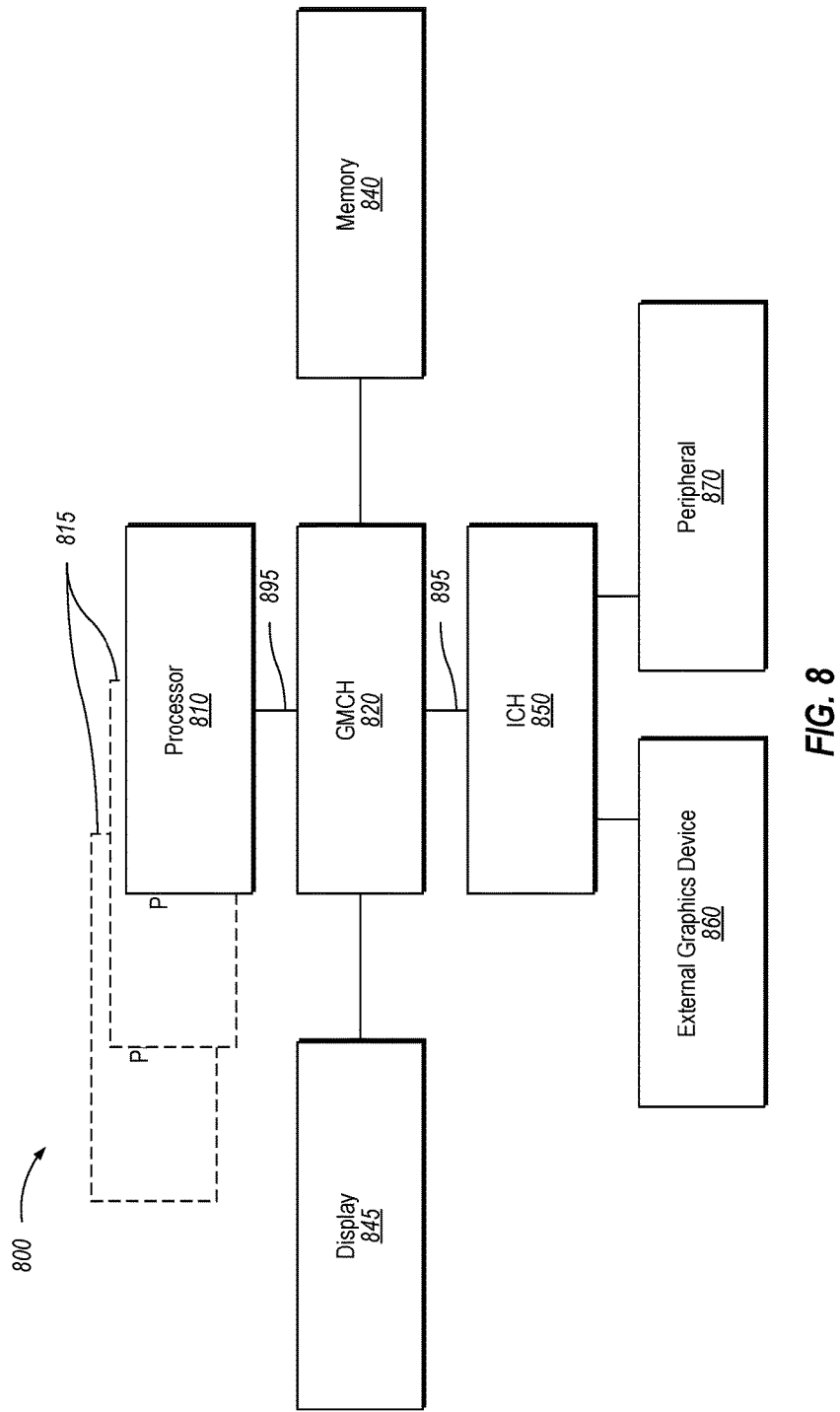
FIG. 8 is a block diagram of a system in which an implementation of the disclosure may operate.

Referring now to FIG. 8, shown is a block diagram of a system 800 in which one implementation of the disclosure may operate. The system 800 may include one or more processors 810, 815, which are coupled to graphics memory controller hub (GMCH) 820. The optional nature of additional processors 815 is denoted in FIG. 8 with broken lines. In one implementation, processors 810, 815 implement hybrid cores according to implementations of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one implementation, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one implementation, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the implementation of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one implementation, the various processors 810, 815 may reside in the same die package.

Figure 9:
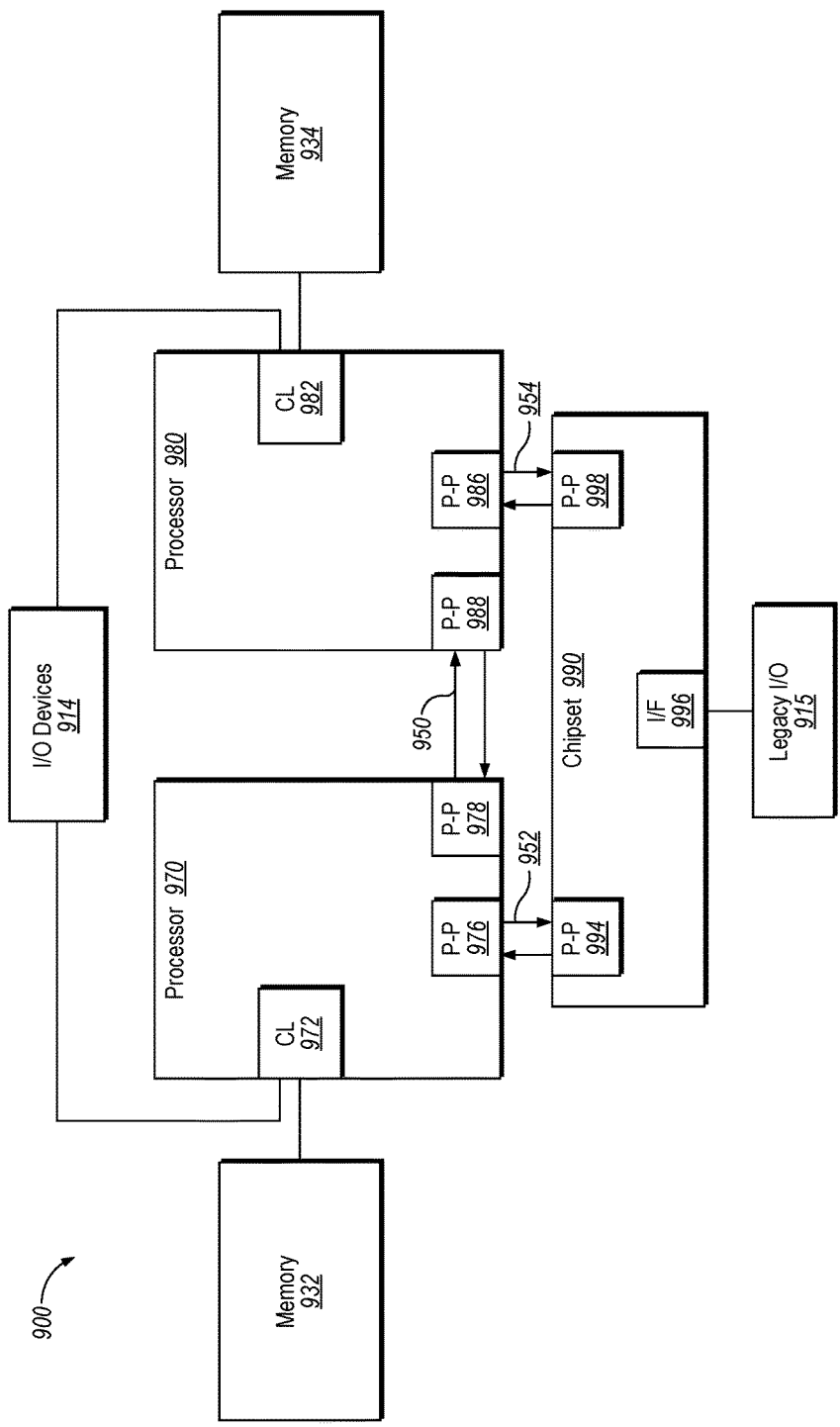
FIG. 9 is a block diagram of a system in which an implementation of the disclosure may operate.

Referring now to FIG. 9, shown is a block diagram of a system 900 in which an implementation of the disclosure may operate. FIG. 9 illustrates processors 970, 980. In one implementation, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one implementation, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
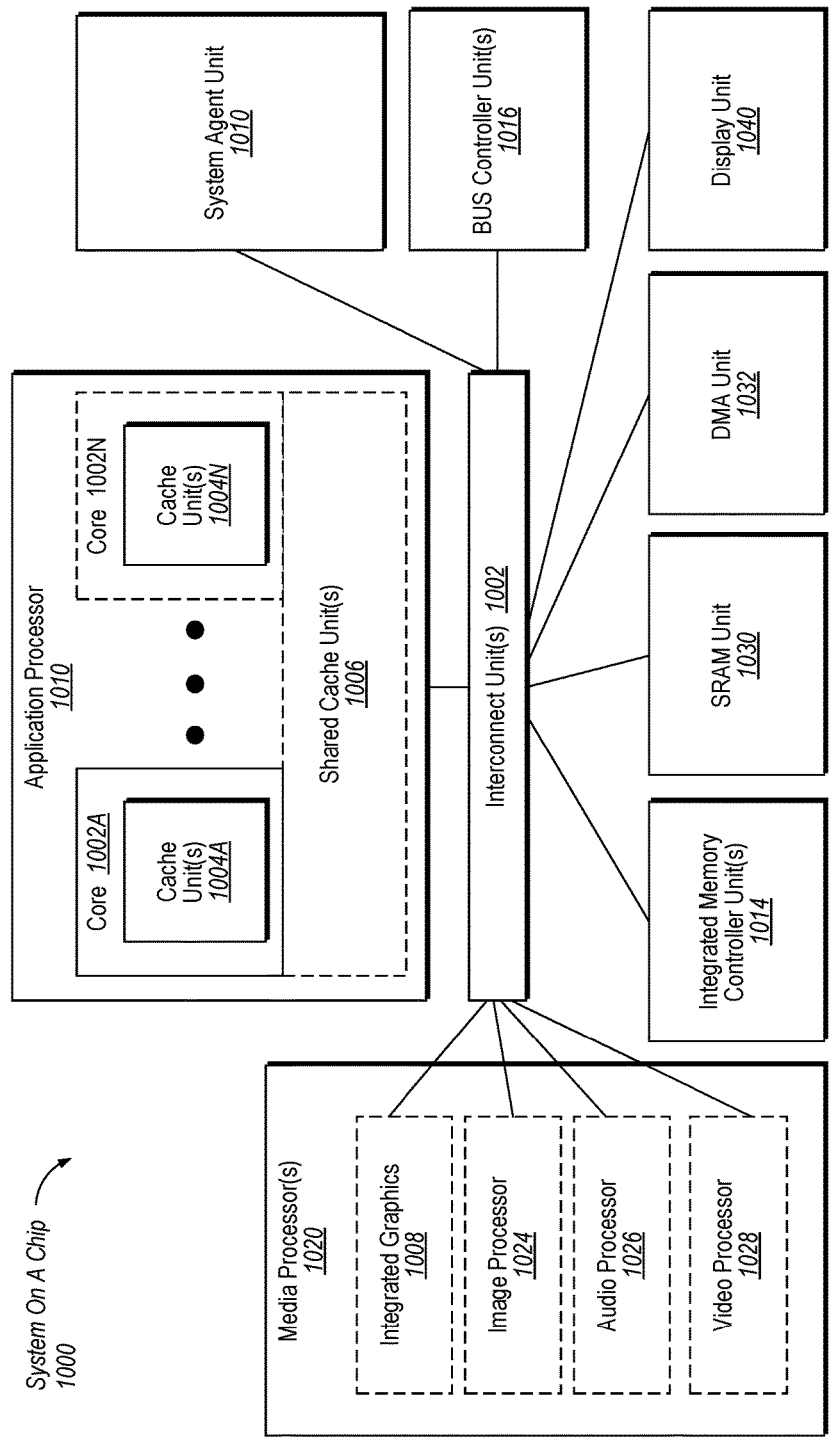
FIG. 10 is a block diagram of a System-on-a-Chip (SoC) in accordance with an implementation of the disclosure.

Implementations may be implemented in many different system types. FIG. 10 is a block diagram of a SoC 1000 in accordance with an implementation of the disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one implementation, a memory module may be included in the integrated memory controller unit(s) 1014. In another implementation, the memory module may be included in one or more other components of the SoC 1000 that may be used to access and/or control a memory. The application processor 1020 may include a store address predictor for implementing hybrid cores as described in implementations herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some implementations, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
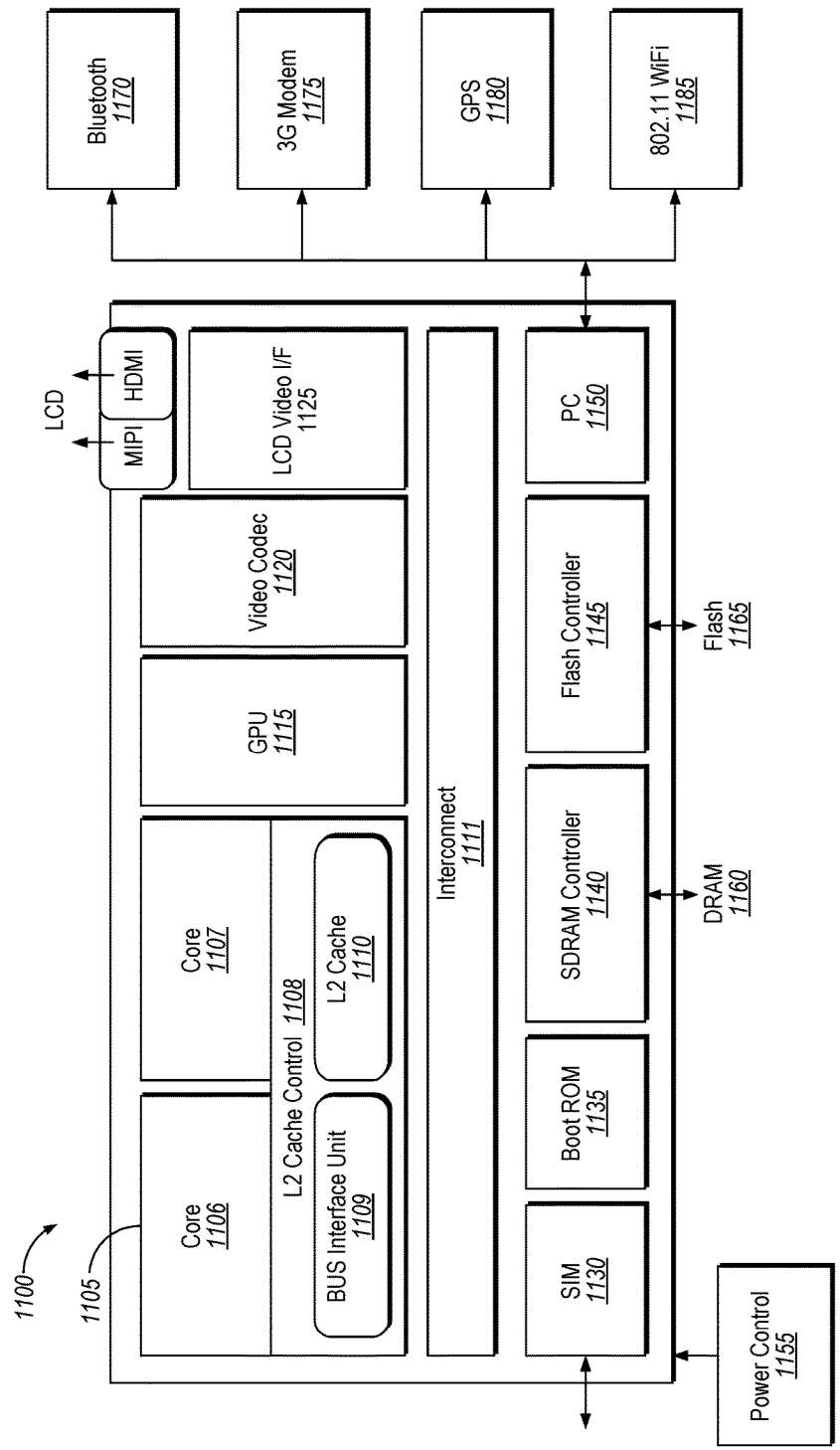
FIG. 11 is a block diagram of an implementation of an SoC design in accordance with the disclosure.

FIG. 11 is a block diagram of an implementation of a system on-chip (SoC) design in accordance with the disclosure. As a specific illustrative example, SoC 1100 is included in user equipment (UE). In one implementation, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores-1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one implementation, cores 1106, 1107 may implement hybrid cores as described in implementations herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
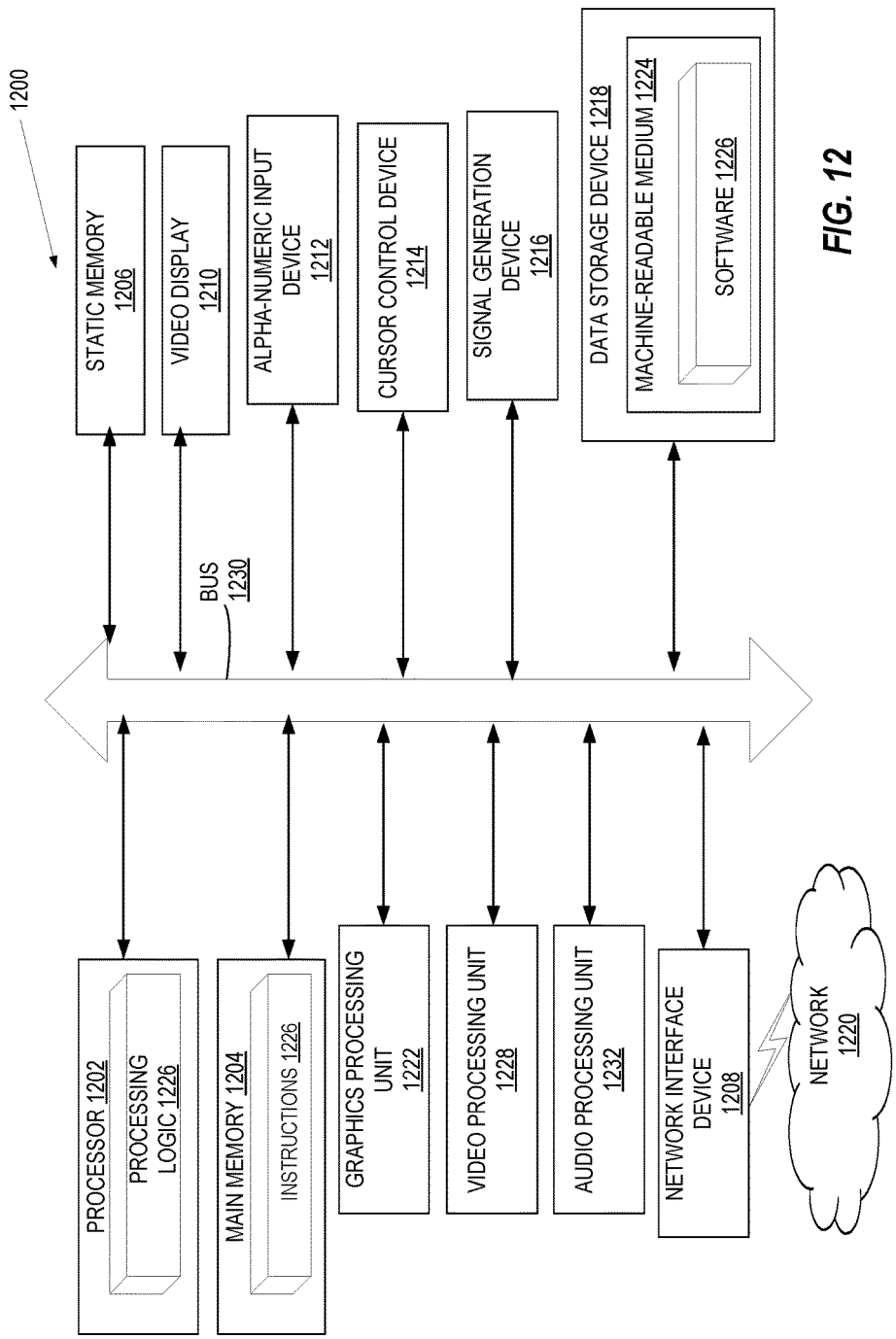
FIG. 12 illustrates a block diagram of one implementation of a computer system.

FIG. 12 illustrates a diagrammatic representation of a machine in the example form of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one implementation, processing device 1202 may include one or processing cores. The processing device 1202 is configured to execute the processing logic 1226 for performing the operations and steps discussed herein. In one implementation, processing device 1202 is the same as processor architecture 100 described with respect to FIG. 1 as described herein with implementations of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to implementations of the disclosure. While the machine-accessible storage medium 1128 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further implementations.

Example 1 is a processing device comprising an error status register and an error status component communicably coupled to the error status register, the error status component to determine that a machine check error (MCE) is a first correctable error (CE) and set a first error status corresponding to the first CE in the error status register based on a threshold value, wherein the threshold value is based on a type of the first CE.

In Example 2, the subject matter of Example 1 can optionally include wherein the first CE is logged in the error status register.

In Example 3, the subject matter of Examples 1-2 can optionally include wherein the first error status is set to indicate a high critical status in response to the first CE being above the threshold value, and wherein the first error status is set to indicate a low critical status in response to the first CE being below the threshold value.

In Example 4, the subject matter of Examples 1-3 can optionally include wherein the error status component is further to receive a second error, wherein the second error occurs after the first error.

In Example 5, the subject matter of Examples 1-4 can optionally include wherein the error status component to determine that the second error is a second CE; and set a second error status to the second CE based on the threshold value, wherein the second error status is set to indicate a high critical status in response to the second CE being above the threshold value, and wherein the second error status is set to indicate a low status in response to the second CE being below the threshold value.

In Example 6, the subject matter of Examples 1-5 can optionally include wherein the error status component to prevent overwrite of the first CE in the error status register by the second CE in response to a determination that the second error status of the second CE indicates the low critical status and in response to a determination that the first error status of the first CE indicates the high critical status.

In Example 7, the subject matter of Examples 1-6 can optionally include wherein the error status component to allow overwrite of the first CE in the error status register by the second CE in response to a determination that the second error status of the second CE indicates the high critical status and in response to a determination that the first error status of the first CE indicates the low critical status.

Example 8 is a system-on-a chip (SoC) comprising a memory; and a processor, communicatively coupled to the memory, comprising an error status register; and an error status component communicably coupled to the error status register, the error status component to determine that a machine check error (MCE) is a first correctable error (CE) and to set a first error status corresponding to the first CE in the error status register based on a threshold value, wherein the threshold value is based on a type of the first CE.

In Example 9, the subject matter of Example 8 can optionally include wherein the first CE is logged in the error status register, wherein the first error status is set to indicate a high critical status in response to the first CE being above the threshold value and the first error status is set to indicate a low critical status in response to the first CE being below the threshold value.

In Example 10, the subject matter of Examples 8-9 can optionally include wherein the error status component to prevent overwrite of the first CE in the error status register by a second CE in response to a determination that a second error status of the second CE indicates the low critical status and in response to a determination that the first error status of the first CE indicates the high critical status wherein the second CE occurs after the first CE; and to allow overwrite of the first CE in the error status register by the second CE in response to a determination that a second error status of the second CE indicates the high critical status and in response to a determination that the first error status of the first CE indicates the low critical status.

Example 11 is a method comprising determining that a machine check error (MCE) is a first correctable error (CE); and setting a first error status corresponding to the first CE in an error status register based on a threshold value, wherein the threshold value is based on a type of the first CE.

In Example 12, the subject matter of Example 11 can optionally include wherein the first CE is logged in the error status register, wherein the first error status is set to indicate a high critical status in response to the first CE being above the threshold value and the first error status is set to indicate a low critical status in response to the first CE being below the threshold value.

In Example 13, the subject matter of Examples 11-12 can optionally further comprising receiving a second error, wherein the second error is a second CE and occurs after the first error.

In Example 14, the subject matter of Examples 11-13 can optionally further comprising preventing overwrite of the first CE in the error status register by the second CE in the error status register in response to a determination that a second error status of the second CE indicates the low critical status and in response to a determination that the first error status of the first CE indicates the high critical status.

In Example 15, the subject matter of Examples 11-14 can optionally further comprising allowing overwrite of the first CE in the error status register by the second CE in response to a determination that a second error status of the second CE indicates the high critical status and in response to a determination that the first error status of the first CE indicates the low critical status.

Example 16 is a non-transitory machine-readable storage medium including instructions that, when accessed by a processing device, cause the processing device to perform operations comprising determining that a machine check error (MCE) is a first correctable error (CE); and setting a first error status corresponding to the first CE in an error status register based on a threshold value, wherein the threshold value is based on a type of the first CE.

In Example 17, the subject matter of Example 16 can optionally include wherein the first CE is logged in the error status register, wherein the first error status is set to indicate a high critical status in response to the first CE being above the threshold value and the first error status is set to indicate a low critical status in response to the first CE being below the threshold value.

In Example 18, the subject matter of Examples 16-17 can optionally include wherein the operations further comprising receiving a second error, wherein the second error is a second CE and occurs after the first error.

In Example 19, the subject matter of Examples 16-18 can optionally include wherein the operations further comprising preventing overwrite of the first CE in the error status register by the second CE in the error status register in response to a determination that a second error status of the second CE indicates the low critical status and in response to a determination that the first error status of the first CE indicates the high critical status.

In Example 20, the subject matter of Examples 16-19 can optionally include wherein the operations further comprising allowing overwrite of the first CE in the error status register by the second CE in response to a determination that a second error status of the second CE indicates the high critical status and in response to a determination that the first error status of the first CE indicates the low critical status.

While the disclosure has been described with respect to a limited number of implementations, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example, the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

What is claimed is:

1. A processing device comprising:
an error status register; and
an error status component communicably coupled to the error status register, the error status component to:
determine that a machine check error (MCE) is a first correctable error (CE);
compare the first CE to a threshold value, the threshold value assigned based on a type of the first CE; and
set a first error status corresponding to the first CE in the error status register based on a result of comparing the first CE to the threshold value, wherein the first CE maintains status as a CE responsive to exceeding the threshold value.

2. The processing device of claim 1 wherein the first CE is logged in the error status register.

3. The processing device of claim 1 wherein the first error status is set to indicate a high critical status in response to the first CE being above the threshold value, and wherein the first error status is set to indicate a low critical status in response to the first CE being below the threshold value.

4. The processing device of claim 3 wherein the error status component is further to receive a second error, wherein the second error occurs after the first error.

5. The processing device of claim 4 wherein the error status component to:
determine that the second error is a second CE; and
set a second error status to the second CE based on the threshold value, wherein the second error status is set to indicate a high critical status in response to the second CE being above the threshold value, and wherein the second error status is set to indicate a low status in response to the second CE being below the threshold value.

6. The processing device of claim 5 wherein the error status component to prevent overwrite of the first CE in the error status register by the second CE in response to a determination that the second error status of the second CE indicates the low critical status and in response to a determination that the first error status of the first CE indicates the high critical status.

7. The processing device of claim 5 wherein the error status component to allow overwrite of the first CE in the error status register by the second CE in response to a determination that the second error status of the second CE indicates the high critical status and in response to a determination that the first error status of the first CE indicates the low critical status.

8. A system-on-a chip (SoC) comprising:
a memory; and
a processing device communicably coupled to the memory, wherein the processing device comprises:
an error status register; and an error status component communicably coupled to the error status register, the error status component to:
    determine that a machine check error (MCE) is a first correctable error (CE);
    compare the first CE to a threshold value, the threshold value assigned based on a type of the first CE; and
    set a first error status corresponding to the first CE in the error status register based on a result of comparing the first CE to the threshold value, wherein the first CE maintains status as a CE responsive to exceeding the threshold value.

9. The SoC of claim 8 wherein the first CE is logged in the error status register, wherein the first error status is set to indicate a high critical status in response to the first CE being above the threshold value and the first error status is set to indicate a low critical status in response to the first CE being below the threshold value.

10. The SoC of claim 9 wherein the error status component to:
    prevent overwrite of the first CE in the error status register by a second CE in response to a determination that a second error status of the second CE indicates the low critical status and in response to a determination that the first error status of the first CE indicates the high critical status wherein the second CE occurs after the first CE; and
    to allow overwrite of the first CE in the error status register by the second CE in response to a determination that a second error status of the second CE indicates the high critical status and in response to a determination that the first error status of the first CE indicates the low critical status.

11. A method comprising:
    determining that a machine check error (MCE) is a first correctable error (CE);
    comparing the first CE to a threshold value, the threshold value assigned based on a type of the first CE; and
    setting a first error status corresponding to the first CE in an error status register based on a result of comparing the first CE to the threshold value, wherein the first CE maintains status as a CE responsive to exceeding the threshold value.

12. The method of claim 11 wherein the first CE is logged in the error status register, wherein the first error status is set to indicate a high critical status in response to the first CE being above the threshold value and the first error status is set to indicate a low critical status in response to the first CE being below the threshold value.

13. The method of claim 12 further comprising receiving a second error, wherein the second error is a second CE and occurs after the first error.

14. The method of claim 13 further comprising preventing overwrite of the first CE in the error status register by the second CE in the error status register in response to a determination that a second error status of the second CE indicates the low critical status and in response to a determination that the first error status of the first CE indicates the high critical status.

15. The method of claim 13 further comprising allowing overwrite of the first CE in the error status register by the second CE in response to a determination that a second error status of the second CE indicates the high critical status and in response to a determination that the first error status of the first CE indicates the low critical status.

16. A non-transitory machine-readable storage medium including instructions that, when accessed by a processing device, cause the processing device to perform operations comprising:
    determining that a machine check error (MCE) is a first correctable error (CE);
    comparing the first CE to a threshold value, the threshold value assigned based on a type of the first CE; and
    setting a first error status corresponding to the first CE in an error status register based on a result of comparing the first CE to the threshold value, wherein the first CE maintains status as a CE responsive to exceeding the threshold value.

17. The non-transitory machine-readable storage medium of claim 16 wherein the first CE is logged in the error status register, wherein the first error status is set to indicate a high critical status in response to the first CE being above the threshold value and the first error status is set to indicate a low critical status in response to the first CE being below the threshold value.

18. The non-transitory machine-readable storage medium of claim 17 wherein the operations further comprising receiving a second error, wherein the second error is a second CE and occurs after the first error.

19. The non-transitory machine-readable storage medium of claim 18 wherein the operations further comprising preventing overwrite of the first CE in the error status register by the second CE in the error status register in response to a determination that a second error status of the second CE indicates the low critical status and in response to a determination that the first error status of the first CE indicates the high critical status.

20. The non-transitory machine-readable storage medium of claim 18 wherein the operations further comprising allowing overwrite of the first CE in the error status register by the second CE in response to a determination that a second error status of the second CE indicates the high critical status and in response to a determination that the first error status of the first CE indicates the low critical status.

* * * * *